United States Patent [19]

Kurobe

[11] Patent Number: 5,240,536
[45] Date of Patent: Aug. 31, 1993

[54] METHOD FOR MANUFACTURING HOLLOW AIR SPOILER

[75] Inventor: Masami Kurobe, Suzuka, Japan

[73] Assignee: Sakae Riken Kogyo Co., Ltd., Japan

[21] Appl. No.: 876,911

[22] Filed: Apr. 30, 1992

Related U.S. Application Data

[63] Continuation of Ser. No. 627,358, Dec. 14, 1990, abandoned.

[30] Foreign Application Priority Data

Dec. 16, 1989 [JP] Japan ................... 1-326716

[51] Int. Cl.$^5$ .............................. B29C 65/20
[52] U.S. Cl. .................... 156/228; 156/267; 156/292; 156/304.2; 156/304.6; 156/308.4; 156/499; 264/249; 296/180.1
[58] Field of Search .................. 156/228, 304.2, 304.6, 156/308.4, 309.9, 292, 157, 158, 304.5, 499, 267, 145, 146, 147; 296/180.1; 219/228, 243; 264/249, 545; 425/289

[56] References Cited

U.S. PATENT DOCUMENTS

| | | | |
|---|---|---|---|
| 3,802,943 | 4/1974 | Province | 219/228 |
| 3,846,208 | 11/1974 | McElroy | 219/228 |
| 4,443,288 | 4/1984 | Sawada et al. | 156/309.6 X |
| 4,960,478 | 10/1990 | Newkirk et al. | 156/304.2 X |

FOREIGN PATENT DOCUMENTS 2142287 1/1985 United Kingdom ............ 296/180.1

*Primary Examiner*—Caleb Weston
*Assistant Examiner*—Francis J. Lorin
*Attorney, Agent, or Firm*—Larson & Taylor

[57] ABSTRACT

A method for manufacturing a hollow air spoiler comprising the steps of setting upper and lower parts molded from thermoplastic synthetic resin material by the injection molding method to upper and lower fixed jigs, placing a heater device between the upper and lower parts, pressurizing the upper and lower fixed jigs by bringing them together under pressure, contacting the outer layers of end faces of the upper and lower parts to the heater device under pressure, opening the upper and lower fixed jigs at the time point it has reached a desired melting degree from the outer layers of the end faces toward inside, removing the heater device from the upper and lower fixed jigs, closing the upper and lower fixed jigs, maintaining the pressure until it has reached to a desired dimension directing inwardly from the outer layers of the end faces, opening the upper and lower fixed jigs to remove a product therefrom at the time point the molten thermoplastic synthetic resin material is fixed and united, removing an outwardly expanded portion of synthetic resin material owing to welding under pressure to obtain an intermediate product, and applying a coating to the intermediate product to obtain a finished product.

1 Claim, 5 Drawing Sheets

METHOD FOR MANUFACTURING HOLLOW AIR SPOILER

This application is a continuation of application Ser. No. 07/627,358 filed Dec. 14, 1990 now abandoned.

BACKGROUND OF THE INVENTION

1. Field of the Invention

This invention relates to a method for manufacturing an air spoiler for ensuring stability when a car is running at a high speed and particularly to a method for manufacturing a hollow air spoiler.

2. Brief Description of the Prior Art

① There is a conventional method for manufacturing an air spoiler in which an air spoiler (A) with a hollow interior is formed by blowing, as shown in FIGS. 1, 2 and 3 (rear air spoiler is exemplified).

In this blow molding, large fins are generated from the mating surfaces of a forming metal mold. Also, in the molding process, vacuum drawing is effected from the outer surface of the forming metal mold at the same time the mold is tightened after the parison process is ended in order to charge high pressure air or gas into the parison. Owing to irregular line at the parison time, vacuum drawing and shortage of charging amount of high pressure air, pin holes or the like are generated in the outer surface layer of the forming metal mold. In order to apply a high quality coating to the flush (flat) surface of a finished product, a large number of processes such as a fin finishing process and a sanding process are required.

Also, as a uniform wall thickness is sometime unable to obtain depending on the configuration of a product, the product is manufactured with reference to a wall thickness thicker than necessary. As a result, waste of material occurs. Furthermore, it has such a shortcoming as that a complicated internal configuration required for forming a reinforcement rib and a bearing surface for mounting other parts thereon is unobtainable.

② There is another conventional method for manufacturing an air spoiler, in which a reinforcement metal piece (a) is provided to the interior as shown in the sectional views of FIGS. 4 and 5, and a soft or hard foam urethane resin is formed into an air spoiler by reaction molding.

According to this urethane reaction molding, since a reinforcement metal piece (a) is provided to the interior, it has such a shortcoming as that the weight becomes heavy. It also has such a shortcoming as that after the reaction molding, a void existing in a molded product causes the outer surface to be swollen when a coating is applied, or a post foaming is taken place when coating of the molded product is being dried and the coating surface of the molded product is swollen. By this, the yield of product of a finished product becomes bad and a finished product of high quality is unobtainable.

③ There is still another conventional method for manufacturing an air spoiler in which a hollow member, as shown in the sectional view of FIG. 6, is comprised of an upper part (1) and a lower part (2), the upper part (1) being formed into a convex shape and the lower part (2) into a concave shape, an adhesive agent (t) is charged into a concave portion (c) of the lower part (2) and then the upper part (1) is united and attached onto the lower part (2). Thereafter, a putty (t') is applied to the entire periphery of a gap portion (c') of the outer surface and then dried and subjected to sanding treatment.

According to this two part attaching method, there are such shortcomings as that a uniform strength is difficult to obtain owing to irregularity of the applying amount of adhesive agent (t) and that since the coating, baking and drying operation are performed after a putty (t') finishing operation was effected to the mating surfaces of the two parts, the putty (t') charging portion is deformed to a concave shape. As a result, the merchandise value with respect to the outer appearance is lowered.

The present invention has been accomplished in order to obviate the problems inherent in the above-mentioned three conventional methods ①, ② and ③.

SUMMARY OF THE INVENTION

It is therefore a first object of the present invention to provide a method for effectively manufacturing a hollow air spoiler.

A second object of the present invention is to provide an intermediate product of a hollow air spoiler which can be finished with ease.

In order to achieve the above object, there is essentially provided a method for manufacturing a hollow air spoiler.

According to the method of the present invention, a first molding part (upper part) and a second molding part (lower part) are respectively molded from thermoplastic synthetic resin material by an injection molding method.

And after the upper and lower parts are set to fixed jigs respectively, a heater device is installed between the upper and lower parts, the fixed jigs are brought together under pressure, end faces of the upper and lower parts are melted by the heat of the heater device and then the fixed jigs are opened to promptly remove a heater device body from the fixed jigs. Then, by pressurizing the fixed jigs again in order to unite and weld the upper and lower parts, there can be obtained an intermediate product of a united hollow air spoiler. Then a coating is applied to the outer surface of the intermediate product to obtain a finished product of an air spoiler.

The above objects and features of the present invention will become manifest to those skilled in the art from the following detailed description of the invention with reference to the drawings.

BRIEF DESCRIPTION OF THE DRAWINGS

FIG. 7b is an enlarged sectional view taken on line VIIb—VIIb of FIG. 7a;

DETAILED DESCRIPTION OF THE INVENTION

The embodiment of a method for manufacturing a hollow air spoiler of the present invention will be described hereunder.

Figure 1:
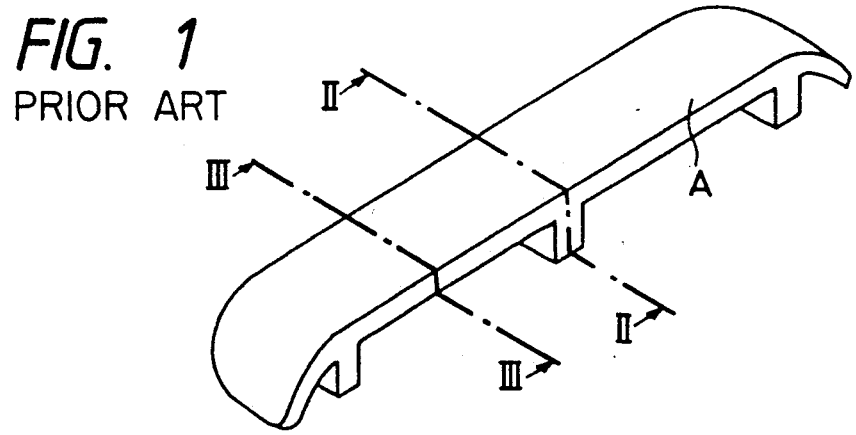
FIG. 1 is a perspective view of the whole picture of a conventional air spoiler.
Figure 2:
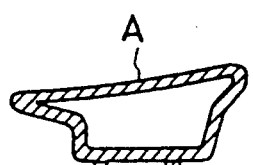
FIG. 2 is a sectional view taken on line II—II of FIG. 1.
Figure 3:
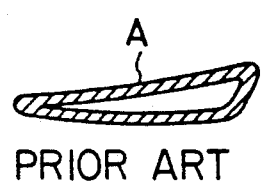
FIG. 3 is a sectional view taken on line III—III of FIG. 1.
Figure 4:
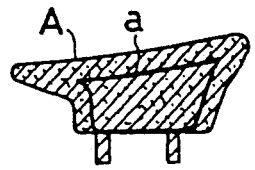
FIG. 4 is a sectional view of another conventional air spoiler taken on line II—II of FIG. 1.
Figure 5:
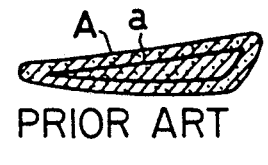
FIG. 5 is likewise a sectional view of another conventional air spoiler taken on line III—III of FIG. 1.
Figure 6:
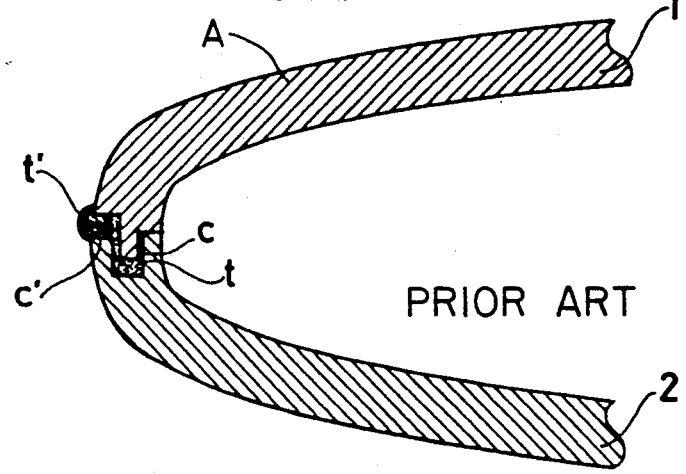
FIG. 6 is a partly enlarged sectional view of another conventional hollow air spoiler.
Figure 7A:
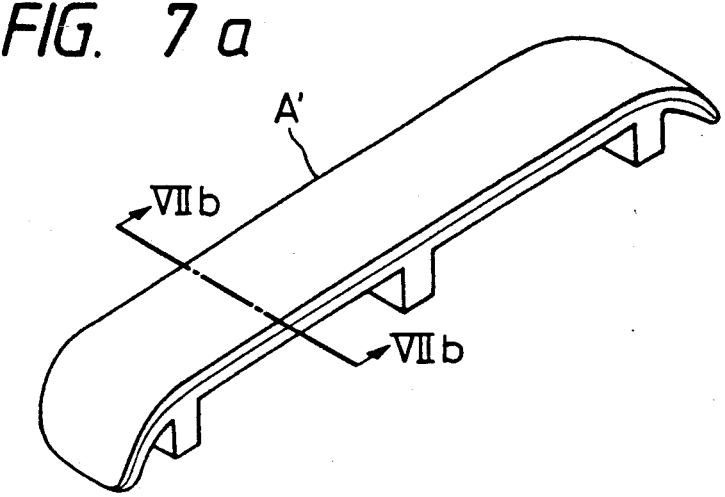
FIG. 7a is a perspective view of the whole picture of a form body of a hollow air spoiler of the present invention.
Figure 7B:
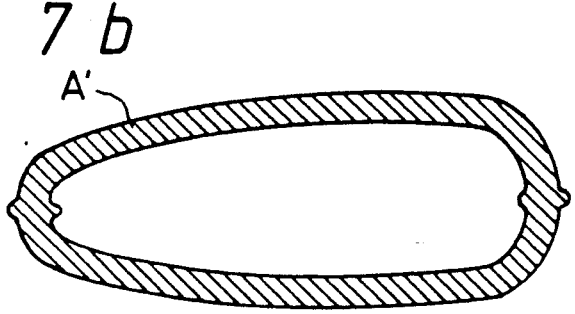

FIG. 7a is a perspective view of the entire picture of a hollow air spoiler form body (A') of the present invention. FIG. 7b is an enlarged view taken on line VIIb—VIIb of FIG. 7a.

Figure 8:
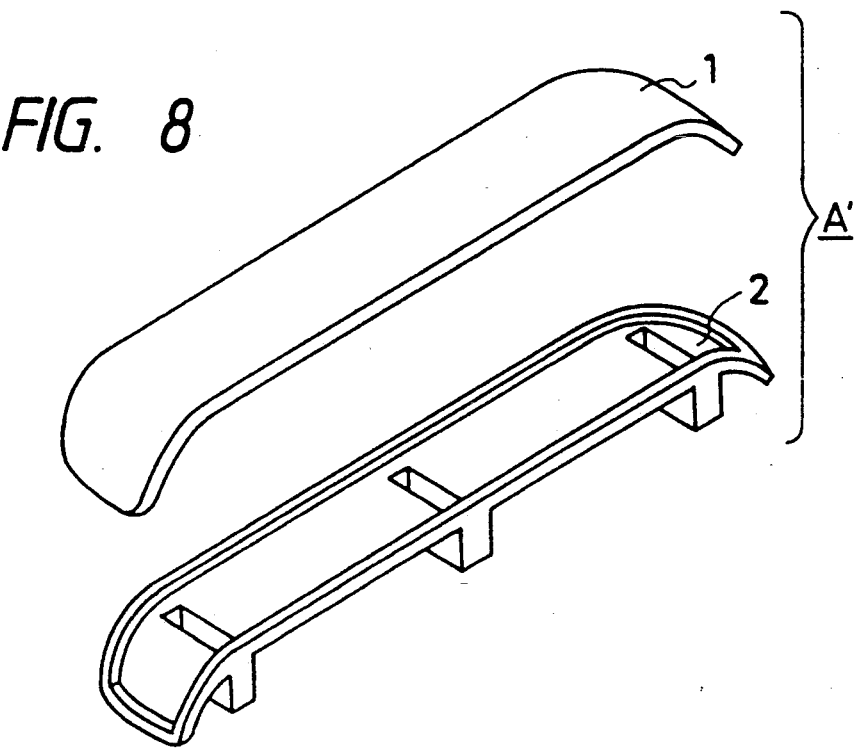
FIG. 8 is a perspective view of upper and lower parts of the form body of the hollow air spoiler of the present invention.

The hollow air spoiler form body (A') of the present invention, as shown in FIG. 8, is molded first as a two part structure of an upper part (1) and a lower part (2) from thermoplastic resin by the injection molding method.

In order to obtain a finished product of a high class, integral, hollow and high quality air spoiler, it is preferable that the upper and lower parts (1) and (2) are formed from a same kind of material.

In general, the required quality of air spoilers is to have no thermal deformation and torsion and to have a shock resisting property because the air spoiler is mounted in a horizontal posture. Suitable materials satisfying these requirement are synthetic resins such as PPE, alloy material of PPE and PA-6, PBT, heat resisting ABS, PC and the like.

Figure 9:
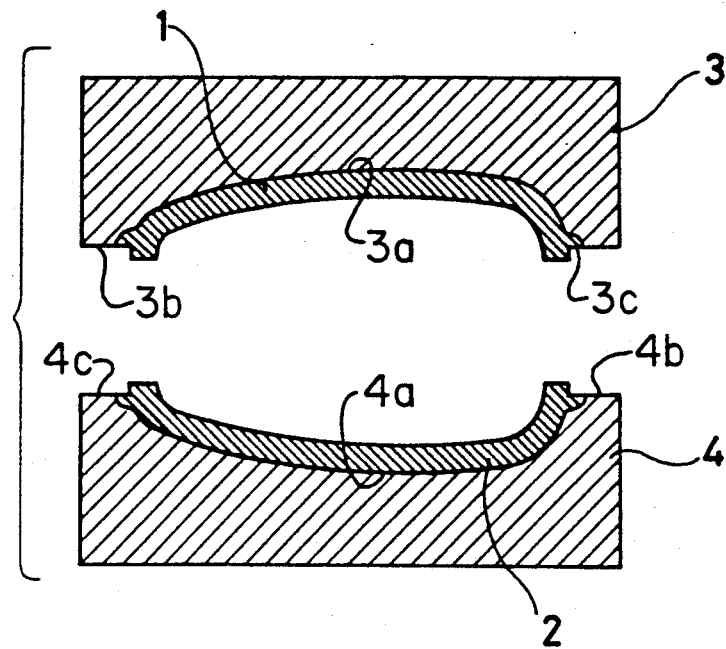
FIG. 9 is a vertical sectional view showing a state immediately before the form body of the hollow air spoiler of the present invention is molded.

The upper and lower parts (1) and (2) obtained in FIG. 8 are set in fixed jigs (3) and (4) (see FIG. 9). The jigs (3) and (4) include recesses (3a) and (4a) therein which, as illustrated, conform to the rear and lateral outer surfaces of the respective parts (1) and (2). As is also shown, the jigs (3) and (4) further include facing or opposed surfaces (3b) and (4b).

The fixed jigs (3) and (4) may preferably be fixed to a pneumatic cylinder, a hydraulic cylinder or a mounting device which is able to move upward and downward mechanically.

Figure 10:
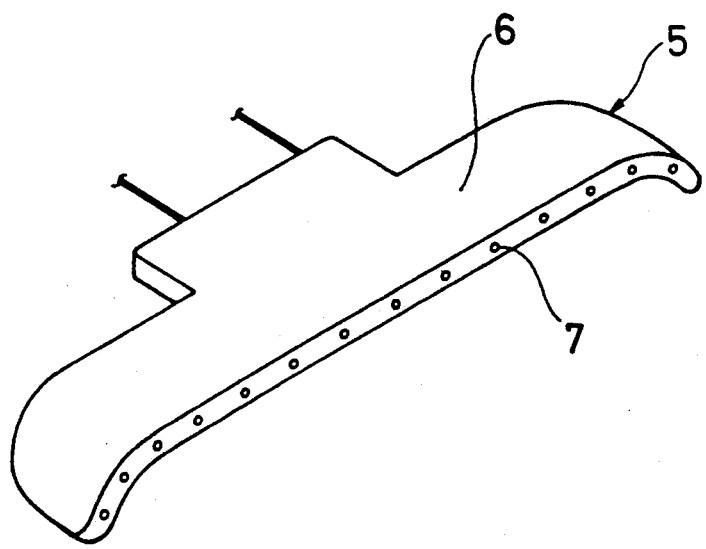
FIG. 10 is a perspective view of a heater device.
Figure 11:
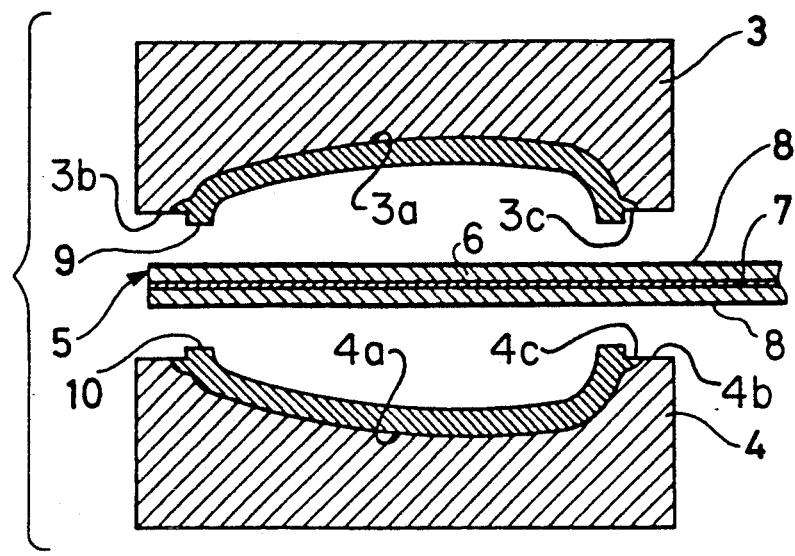
FIGS. 11 through 14 are vertical sectional views showing a state where the form body of the hollow air spoiler of the present invention is being molded.

Then, as is shown in FIG. 10, a heater device (5) having a heater plate (6) containing a heater (7) is installed between the upper and lower parts (1) and (2) (see FIG. 11).

The heater device (5) contains the heater (7), as already mentioned above, so that it can be controlled to a suitable temperature for melting a thermoplastic synthetic resin material in order to melt the outer end faces (9) and (10) of the upper and lower parts (1) and (2).

Figure 12:
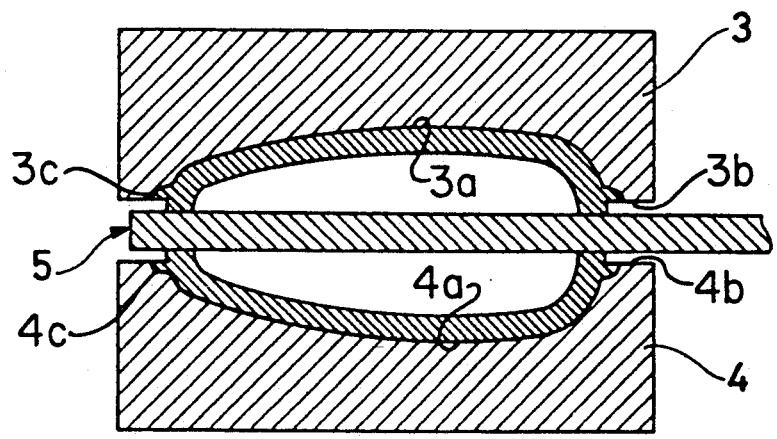

A Teflon coating layer (8) may preferably be applied to the outer layer of the heater plate (6) so that molten thermoplastic synthetic resin material will not adhere to the heater plate (6). The heater device (5) is set to a temperature corresponding to a melting temperature of the thermoplastic synthetic resin material to be melted, the upper and lower fixed jigs (3) and (4) are pressurized, i.e., brought together under pressure as shown in FIG. 12, and the outer layers of the end faces (9) and (10) of the upper and lower parts (1) and (2) are brought into contact with to the heater device (5) surfaces. This pressurizing operation is performed by adequately controlled the setting temperature and time.

Figure 13:
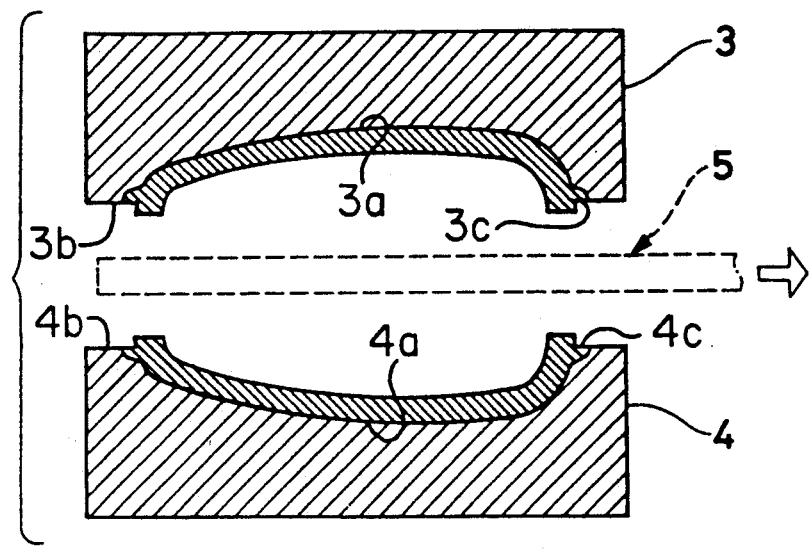

At the time point the melt has progressed by 0.5~3 mm inwardly from the outer layers of the end faces (9) and (10), the upper and lower fixed jigs (3) and (4) are quickly opened and the heater device (5) is promptly removed from the upper and lower fixed jigs (3) and (4) (see FIG. 13).

Figure 14:
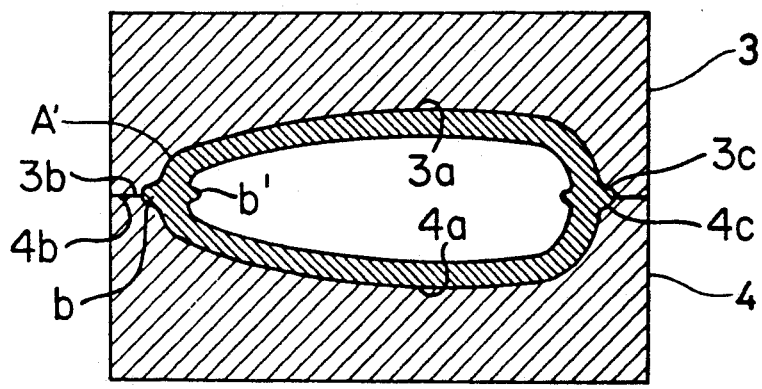

Then, as is shown in FIG. 14, the upper and lower fixed jigs (3) and (4) are closed and kept to be pressurized until the melt progresses by 0.5~5 mm inwardly from the outer layers of the end faces (9) and (10). As illustrated in FIGS. 9, 11, 12 and 13, the facing terminal end portions of parts (1) and (2), i.e., those forming end faces (9) and (10), extend outwardly from the respective recesses (3a) and (4a) of the jigs (3) and (4) towards each other and thus project beyond the opposed faces (3b) and (4b) of the jigs (3) and (4) as shown. Further, as shown in FIG. 14 (and in FIGS. 9, 11, 12 and 13), the jigs (3) and (4) also include small grooves (3c) and (4c) around the edges of the recesses (3a) and (4a) adjacent to the respective opposing surfaces (3b) and (4b). These grooves (3c) and (4c) are brought into registration when the opposed faces (3a) and (4b) of jigs (3) and (4) are brought into contact with each other as shown in FIG. 14. As is also shown in FIG. 14, the end faces (9) and (10) of the parts (1) and (2) expand outwardly into the aligned grooves (3c) and (4c) to form an external "fin" or bead (b), in addition to expanding in the opposite direction to form an inner "fin" or bead (b'). At the time point the molten thermoplastic synthetic resin materials are fixed and united, the upper and lower fixed jigs (3) and (4) are opened and the hollow air spoiler form body (A') is removed therefrom.

Figure 15:
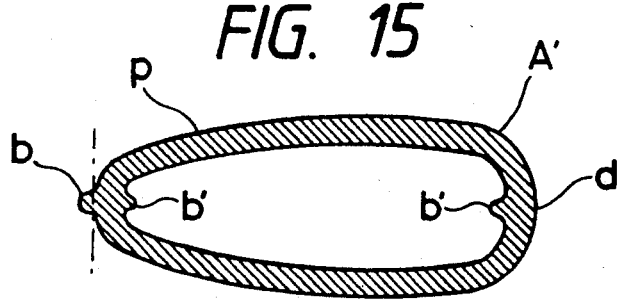
FIG. 15 is a vertical sectional view for explaining a finished state of the form body of the hollow air spoiler of the present invention.

In the hollow air spoiler form body (A') of FIG. 15 which has been removed from the upper and lower fixed jigs (3) and (4), fins (b) and (b') are expanded inward and outward due to welding under heat and pressure. The reference character (d) denotes a portion from which the fin (b) has been removed to complete the finishing. By finishing the entirety in this way, it becomes an intermediate product (P).

In this way, if the fin on the entire outer periphery is removed and the entire outer periphery is finished, the remaining outer layer is a flush (flat) surface obtained by the injection molding method. When coating is applied to that surface, there can be obtained a finished product of a hollow air spoiler which has an outer appearance much superior to that of a product obtained by blowing, reaction molding or welding and uniting method, which has a uniform wall thickness, which is excellent in yield of production at the coating time, and which is low in cost.

That is, according to the present invention, simply by removing small amount of swollen portions generated on the welded mating surfaces of the upper and lower parts (1) and (2) having flush (flat) surfaces obtained by the injection molding method, there can be obtained an intermediate product (P) of a hollow air spoiler having a flush outer surface and of high quality. The sanding finish for the entire outer surface is no longer required in the coating process. Moreover, there is no worry of voids and swelling owing to post foaming. As a result, there can be obtained a finished product of a hollow air spoiler of high quality and low cost.

The present invention is likewise applicable to a roof spoiler, an air dam skirt, a rear under-spoiler and the like besides the illustrated rear spoiler.

Although the invention has been illustrated and described in the form of one preferred embodiment, the invention is of course not limited to this embodiment. Many changes and modifications can be made within the spirit of the invention and are naturally included in the scope of the appended claims.

What is claimed is:

1. A method for manufacturing a hollow air spoiler comprising the steps of setting upper and lower injection molded thermoplastic synthetic resin parts having curved rear and lateral outer surfaces and curved end faces into upper and lower fixed jigs including facing surfaces having recesses therein of a curvature conforming to that of the curved rear and lateral outer surfaces of the corresponding part received therein, the relative sizes of the recesses in the jigs and the corresponding parts being such that the lateral portions of the synthetic resin parts are enclosed within the respective recesses and terminal portions of said lateral portions which define said end faces extend outwardly from the recesses so as to project outwardly beyond the facing surfaces of the respective jigs, and said jigs including opposing grooves therein which extend around the corresponding recess adjacent the corresponding facing surface and which are brought into registration when said jigs are closed and said facing surfaces are brought together, placing between said upper and lower parts a heater device having upper and lower curved surfaces each of a curvature matching that of a corresponding curved end face of said upper and lower parts and including heating means distributed over the full length of the heater device to provide uniform heating, bringing together under pressure said upper and lower fixed jigs, contacting the said end faces of said upper and lower parts to said heater device under pressure, opening said upper and lower fixed jigs when a desired degree of melting of said end faces has been achieved, removing said heater device from said upper and lower fixed jigs, closing said upper and lower fixed jigs and applying pressure, maintaining the applied pressure until a desired dimension extending inwardly from said end faces has been achieved and said terminal portions have been joined together to form an outwardly expanded portion of the synthetic resin of the parts which extends around the joined area between the end faces of the parts and which fills the opposing grooves brought into registration with each other when the jigs are closed, opening said upper and lower fixed jigs to remove a product therefrom when the molten thermoplastic synthetic resin of the parts is fixed and united, removing the outwardly expanded portion of the synthetic resin of the parts produced during the application of pressure to thereby obtain an intermediate product, and applying a coating to said intermediate product to obtain a finished product.

* * * * *